United States Patent
Bian et al.

(10) Patent No.: US 10,027,746 B2
(45) Date of Patent: Jul. 17, 2018

(54) MECHANISM FOR OVERLAY VIRTUAL NETWORKING

(71) Applicant: INTERNATIONAL BUSINESS MACHINES CORPORATION, Armonk, NY (US)

(72) Inventors: Guo Chun Bian, Wu Xi (CN); Gang Tang, Nanjing (CN); Zi Jin Tao, Wu Xi (CN); Ming Shuang Xian, Wu Xi (CN)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 15/165,017

(22) Filed: May 26, 2016

(65) Prior Publication Data
US 2017/0346892 A1    Nov. 30, 2017

(51) Int. Cl.
*G06F 15/16* (2006.01)
*H04L 29/08* (2006.01)
*H04L 12/46* (2006.01)
*H04L 29/12* (2006.01)

(52) U.S. Cl.
CPC ...... *H04L 67/1076* (2013.01); *H04L 12/4633* (2013.01); *H04L 12/4641* (2013.01); *H04L 61/6022* (2013.01)

(58) Field of Classification Search
CPC ............. H04L 67/1076; H04L 61/6022; H04L 12/4633; H04L 12/4641
See application file for complete search history.

(56) References Cited

U.S. PATENT DOCUMENTS

| | | | |
|---|---|---|---|
| 9,106,508 B2 | 8/2015 | Banavalikar et al. | |
| 9,178,715 B2 | 11/2015 | Jain et al. | |
| 9,547,570 B2 * | 1/2017 | Chu | G06F 11/263 |
| 9,692,698 B2 * | 6/2017 | Cherian | H04L 45/745 |
| 2013/0272305 A1 | 10/2013 | Lefebvre et al. | |
| 2013/0287022 A1 | 10/2013 | Banavalikar et al. | |
| 2014/0307744 A1 | 10/2014 | Dunbar et al. | |

(Continued)

OTHER PUBLICATIONS

Halpern, J. and Pignataro, C. Service Function Chaining (SFC) Architecture. RFC 7655. Oct. 2015. pp. 1-32.*

(Continued)

*Primary Examiner* — John Macilwinen
(74) *Attorney, Agent, or Firm* — Schmeiser, Olsen & Watts; John Pivnichny (57) ABSTRACT

A method and system for virtual networking is provided. The method includes receiving logical service chain data describing a source virtual network ID (VNID) for a source virtual network, a destination VNID for a destination virtual network, and a group of intermediate waypoints. The logical service chain data defines a logical service chain. A set of networked virtual environments (NVE) is selected to support the group of intermediate waypoints and the logical service chain is deployed and mapped to a physical service chain implemented on the set of NVEs. The logical service chain data is transmitted to a network virtual authority (NVA) and a packet forwarding mechanism is introduced when a packet is received from an overlay port or an underlay port. An associated IP address is requested and the first packet is analyzed.

20 Claims, 6 Drawing Sheets

(56) References Cited

U.S. PATENT DOCUMENTS

| | | | |
|---|---|---|---|
| 2015/0081855 A1 | 3/2015 | Zhang et al. | |
| 2015/0195197 A1 | 7/2015 | Yong et al. | |
| 2015/0236948 A1 | 8/2015 | Dunbar et al. | |
| 2015/0288787 A1 | 10/2015 | Banavalikar et al. | |
| 2015/0365324 A1* | 12/2015 | Kumar | H04L 12/4641 |
| | | | 370/392 |
| 2017/0064717 A1* | 3/2017 | Filsfils | H04L 47/17 |
| 2017/0228251 A1* | 8/2017 | Yang | G06F 9/45558 |
| 2017/0279668 A1* | 9/2017 | Shevenell | H04L 41/0677 |
| 2017/0318097 A1* | 11/2017 | Drew | H04L 67/16 |

OTHER PUBLICATIONS

Salsano, Stefano et al.; Generalized Virtual Networking: an enable for Service Centric Networking and Network Function Virtualization; Networks 2014, 16th International Telecommunications Network Strategy and Planning Symposium; Sep. 17-19, 2014; 7 pages.

Quinn, Paul et al.; Service Function Chaining: Creating a Service Plane via Network Service Headers; Computer, vol. 47, Issue 11; Nov. 2014; pp. 38-44.

Makaya, Christian et al.; Services Composition based on Next-Generation Service Overlay Networks Architecture; 2011 4th IFIP International Conference on New Technologies, Mobility and Security (NTMS); Feb. 7-10, 2011; pp. 1-6.

Quinn, P. et al; Problem Statement for Service Function Chaining; Internet Engineering Task Force (IETF), Request for Comments 7498; Apr. 2015; 14 pages.

John, Wolfgang et al.; Research Directions in Network Service Chaining; 2013 Conference on Software Defined Networking for Future Networks and Services (SDN4FNS); Nov. 11-13, 2013; 7 pages.

* cited by examiner

FIG. 6

MECHANISM FOR OVERLAY VIRTUAL NETWORKING

FIELD

The present invention relates generally to a method for implementing a virtual network and in particular to a method and associated system for overlapping waypoints over differing networked virtual environments.

BACKGROUND

Service functions are typically deployed within networks and provide a range of features such as security, WAN acceleration, and server load balancing. A of service functions are applied to packets for transmission. Virtual networks associated with service chain mechanisms typically require a modification to a packet header of a packet for associated metadata transmission. Accordingly, there exists a need in the art to overcome at least some of the deficiencies and limitations described herein above.

SUMMARY

A first aspect of the invention provides an overlay virtual networking method comprising: receiving, by a processor of a controller hardware device, logical service chain data describing a source virtual network ID (VNID) for a source virtual network, a destination VNID for a destination virtual network, and a group of intermediate waypoints, the logical service chain data defining a logical service chain comprising the source virtual network, the destination virtual network, and the group of intermediate waypoints; selecting by the processor, a set of networked virtual environments (NVE) to support the group of intermediate waypoints; deploying, by the processor, the logical service chain; mapping, by the processor, the logical service chain to a physical service chain implemented on the set of NVEs; transmitting, by the processor to a network virtual authority (NVA), the logical service chain data; receiving from an overlay port, by the processor via a first NVE of the set of NVEs, a first packet; requesting, by the processor in response to the receiving the first packet, associated IP addresses; and analyzing, by the processor, the first packet.

A second aspect of the invention provides a computer program product, comprising a computer readable hardware storage device storing a computer readable program code, the computer readable program code comprising an algorithm that when executed by a computer processor of a controller hardware device implements an overlay virtual networking method, the method comprising: receiving, by the processor, logical service chain data describing a source virtual network ID (VNID) for a source virtual network, a destination VNID for a destination virtual network, and a group of intermediate waypoints, the logical service chain data defining a logical service chain comprising the source virtual network, the destination virtual network, and the group of intermediate waypoints; selecting by the processor, a set of networked virtual environments (NVE) to support the group of intermediate waypoints; deploying, by the processor, the logical service chain; mapping, by the processor, the logical service chain to a physical service chain implemented on the set of NVEs; transmitting, by the processor to a network virtual authority (NVA), the logical service chain data; receiving from an overlay port, by the processor via a first NVE of the set of NVEs, a first packet; requesting, by the processor in response to the receiving the first packet, associated IP addresses; and analyzing, by the processor, the first packet.

A third aspect of the invention provides a controller hardware device comprising a computer processor coupled to a computer-readable memory unit, the memory unit comprising instructions that when executed by the computer processor executes an overlay virtual networking method comprising: receiving, by the processor, logical service chain data describing a source virtual network ID (VNID) for a source virtual network, a destination VNID for a destination virtual network, and a group of intermediate waypoints, the logical service chain data defining a logical service chain comprising the source virtual network, the destination virtual network, and the group of intermediate waypoints; selecting by the processor, a set of networked virtual environments (NVE) to support the group of intermediate waypoints; deploying, by the processor, the logical service chain; mapping, by the processor, the logical service chain to a physical service chain implemented on the set of NVEs; transmitting, by the processor to a network virtual authority (NVA), the logical service chain data; receiving from an overlay port, by the processor via a first NVE of the set of NVEs, a first packet; requesting, by the processor in response to the receiving the first packet, associated IP addresses; and analyzing, by the processor, the first packet.

The present invention advantageously provides a simple method and associated system capable of deploying service functions.

DETAILED DESCRIPTION

Figure 1:
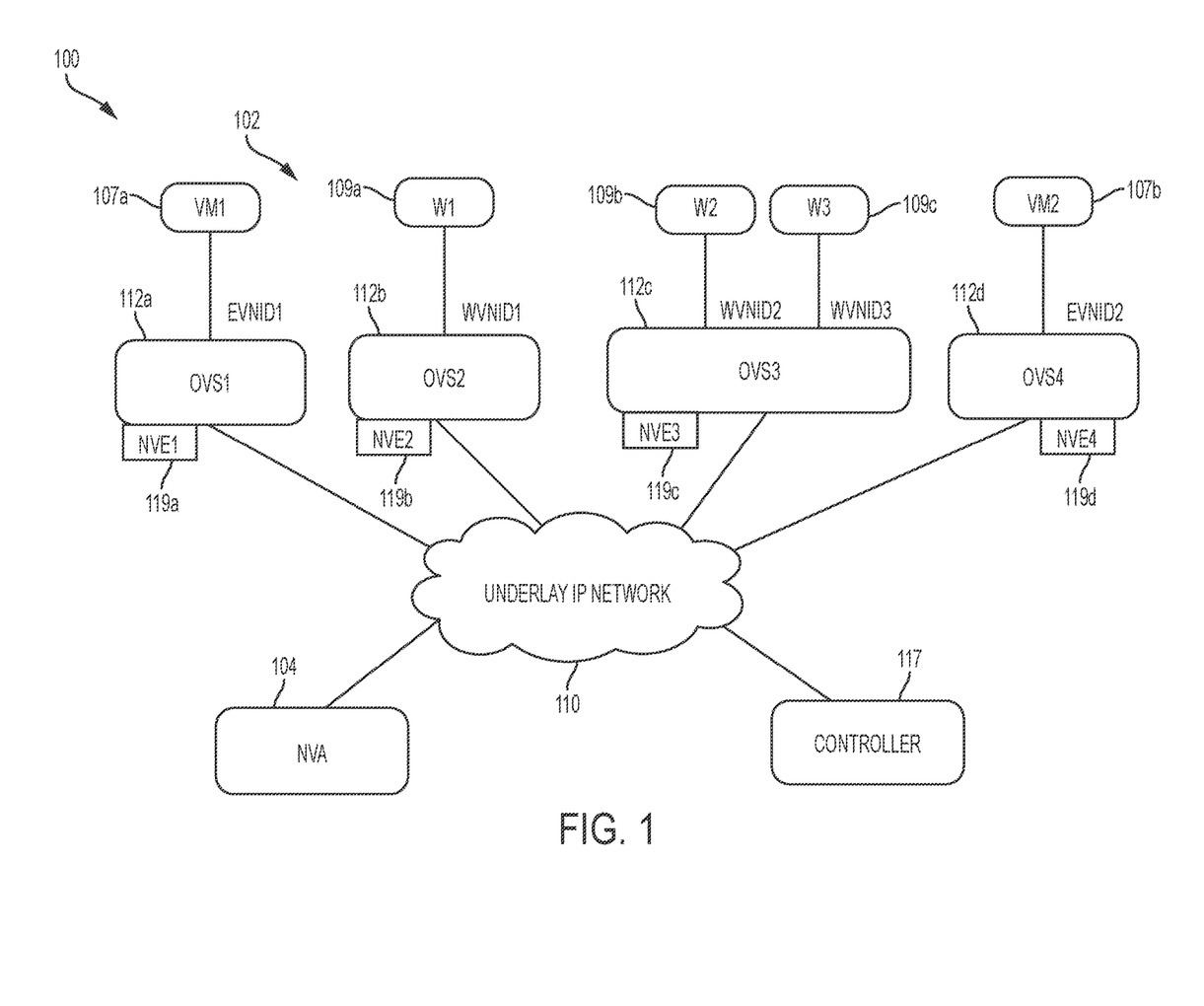
FIG. 1 illustrates a virtual networking environment system for implementing a virtual network comprising overlapping waypoints, in accordance with embodiments of the present invention.

FIG. 1 illustrates a virtual networking environment system 100 for implementing a virtual network comprising overlapping waypoints, in accordance with embodiments of the present invention. A virtual network is defined herein as a logical abstraction of a physical network provides L2 or L3 network services to a set of tenant systems. System 100 enables a process for executing a service chain mechanism 102 (comprising virtual machines 107a and 107b and waypoints 109a-109c) with respect to overlay networks. A service chain is defined herein as a sequence of service nodes associated with packet throughput prior to delivery to an intended destination. Each service node comprises a running instance (e.g., a virtual machine) hosting a specific networking service for filtering and forwarding the packets based on a pre-configured policy. Typical networking services may include, inter alia, a firewall, a load balancing system, intrusion detection systems, etc. A service chain may be defined after all service nodes are instantiated. System 100 enables a plurality of waypoints (e.g., an appliance such as a virtual machine (VM) or Physical machine) to perform networking functions (e.g., a firewall function, a load balance function, etc.). Each logical waypoint comprises a logical service node that has not been instantiated. A networking service node must be instantiated and bind to a logical waypoint to enable a logical service chain. A service chain logically indicates used waypoints before deployment. When a service chain is deployed physically, network virtualization authorities (NVEs) use an underlay IP network 110 and a specified waypoint virtual network ID (VNID) to define a waypoint. A VNID comprises a field in an overlay encapsulation header that identifies a specific virtual network (VN) comprising a packet. An egress NVE uses a VN context identifier to deliver a packet to the correct tenant system. A VN context identifier may comprise a locally significant identifier or a globally unique identifier. A service chain does not require any modification of any part of a data packet forwarded in a service chain path. A waypoint VNID may be overlapped over different virtual switches (NVEs), such that a number of VNIDs used for the waypoints are saved.

Virtual networking environment system 100 includes virtual machines 107a and 107b and waypoints 109a-109c connected via overlay virtual switches (OVS1-OVS4) 112a-112d (each comprising a network virtualization edge (NVEs 119a...119d)) and an underlay IP network 110 to a network virtualization authority (NVA) 104 and a controller 117. Virtual machines 107a and 107b, waypoints 109a-109c, overlay virtual switches 112a-112d, underlay IP network 110, NVA 104, and controller 117 each may comprise or be implemented via an embedded computer or controller. An embedded computer or controller is defined herein as a dedicated computer comprising a combination of computer hardware and software (fixed in capability or programmable) specifically designed for executing a specialized function. Programmable embedded computers may comprise specialized programming interfaces. Additionally, virtual machines 107a and 107b, waypoints 109a-109c, overlay virtual switches 112a-112d, underlay IP network 110, NVA 104, and controller 117 may each comprise or be implemented via a specialized hardware device comprising specialized (non-generic) hardware and circuitry (i.e., specialized discrete non-generic analog, digital, and logic based circuitry) for executing a process described with respect to FIGS. 1-3. The specialized discrete non-generic analog, digital, and logic based circuitry may include proprietary specially designed components (e.g., a specialized integrated circuit designed for only implementing an automated process for implementing a virtual network comprising overlapping waypoints). Underlay IP network 110 may include any type of network including, inter alia, a local area network, (LAN), a wide area network (WAN), the Internet, a wireless network, etc. Overlay virtual switches 112a-112d enable a process for switching and an overlay encapsulation/decapsulation process associated with transmitting, receiving, and forwarding packets from VMs 107a and 107b attached to an overlay port and a physical network link (e.g., an underlay port). NVEs 119a-119d each comprise a network entity placed at the edge of underlay IP network and implementing L3 network virtualization functions. A network-facing side for each of NVEs 119a-119d uses an underlying L3 network to tunnel tenant frames to and from additional NVEs. A tenant-facing side for each of NVEs 119a-119d transmits and receives Ethernet frames to and from individual tenant systems. Underlay IP network 110 provides connectivity among NVEs 119a-119d via locations where NVO3 packets are tunneled. Each NVO3 packet carries an NVO3 overlay header followed by a tenant packet. Underlay IP network 110 is not required to be aware that it is carrying NVO3 packets. Additionally, Underlay IP network 110 addresses on the underlay network appear as outer addresses in encapsulated NVO3 packets. Therefore, underlay IP network 110 may use a differing protocols (and address family) from that of the overlay. In the case of NVO3, the underlay network comprises IP. NVA 104 comprises a policy server responsible for storing and resolving addressing information for virtual networking environment system 100. NVEs 119a-119d rely on NVA 104 to retrieve addressing information to forward a packet to a correct nexthop. A nexthop is defined herein as a next closest router associated with a data packet. The nexthop is comprised by a series of routers connected together in a network and comprises a next possible destination for the data packet. For example, a nexthop comprises an IP address entry in a router's routing table specifying a next closest/most optimal router in its routing path.

Controller 117 enables a process for configuring and managing an entire virtual network. For example, controller 117 may enable a process for: configuring VNIDS for each virtual network, addressing information to NVA, additional configurations to the NVEs and NVA, etc.

Virtual networking environment system 100 enables a process for implementing a virtual network comprising overlapping waypoints as follows:

A service chain defines a sequence of way points associated with network traffic throughput to an intended destination. An NVE (identified by a TEP IP address) is specified (with respect to waypoints), when the service chain is deployed for network traffic originating from a source virtual network (VNID) to a destination VNID. The specified NVE indicates a location for a VM associated with a specific way point. In response, a controller allocates a VNID (not assigned for any other way points pertaining to that NVE) from a reserved space (e.g., 1-256) for the specific way point. A corresponding instance (e.g., a VM) of a logical way point is launched on the specified NVE and attached to the VNID. In response, virtual networking environment system 100 directs network traffic flow through the VM in accordance with a predefined sequence of way points. Additionally, a plurality of logical way point instances attaching to different NVEs may be launched for each way point. For a same way point, the controller may allocate different locally significant VNIDs to different NVEs. When an upstream NVE directs the network traffic to a logical way point instance according predefined policy, it selects one of the logical way point instances according a specified algorithm and encapsulates and transmits an associated packet through an overlay channel towards the selected logical way point instance. Therefore, the VNID in the overlay header and the destination IP of the outer header of the encapsulated packet are associated with the logical way point instance.

Figure 2:
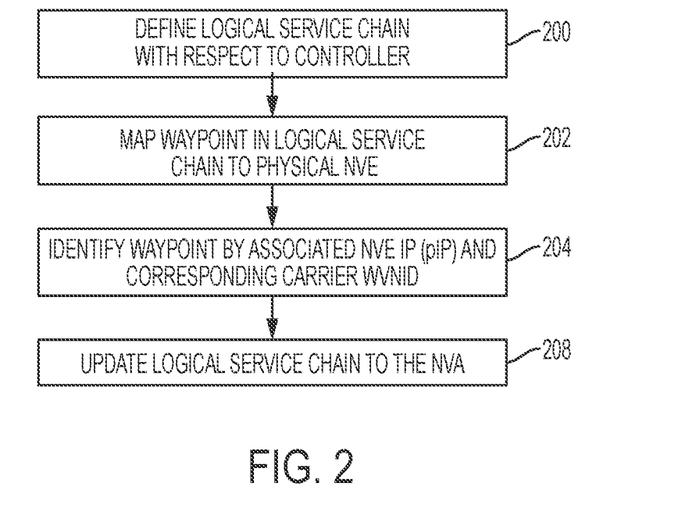
FIG. 2 illustrates an algorithm detailing a process flow enabled by the virtual networking environment system of FIG. 1 for enabling a controller based service chain deployment process, in accordance with embodiments of the present invention.

FIG. 2 illustrates an algorithm detailing a process flow enabled by virtual networking environment system 100 of FIG. 1 for enabling a controller based service chain deployment process, in accordance with embodiments of the present invention. Each of the steps in the algorithm of FIG. 2 may be enabled and executed in any order by a computer processor(s) or any type of specialized hardware executing computer code. In step 200, a user defines a logical service chain (SC) with respect to a controller (i.e., specialized hardware) defined with respect to a source VNID, a destination VNID, and intermediate waypoints. The SC may be defined (with respect to FIG. 1) as SC1={EVNID1, W1, W2, W3, EVNID2}. In step 202, the intermediate waypoints are mapped to a group of NVEs for implementation and deployment. A set of NVEs may be selected to support the intermediate waypoints. For example with respect to FIG. 1, NVE2 is selected to support W1 and NVE3 is selected to support W2 and W3. The user may select the most appropriate NVEs to deploy the intermediate waypoints with respect to a network topology, NVE current load, etc. In step 204 (when the logical SC is deployed), the logical SC is deployed and mapped to a physical SC implemented with respect to actual NVEs. Each intermediate waypoint is identified by its associated NVE and corresponding carrier WVNID. For example, in FIG. 1, for W1, it's identified by (pIP2, WVNID2). With respect to FIG. 1, the physical SC may be presented as {EVNID1, (pIP2, WVNID1), (pIP3, WVNID2), (pIP3, WVNID3), EVNID2}. Each NVE is associated with a specified VNID (i.e., a waypoint VNID or an endpoint VNID). In step 208, the controller forwards a definition associated with the SC to an NVA. The NVA is associated with all intermediate waypoints and an associated order in the SC. Additionally, the NVA is associated with a forwarding path such that when it receives a packet, it will request the NVA SC.

Figure 3:
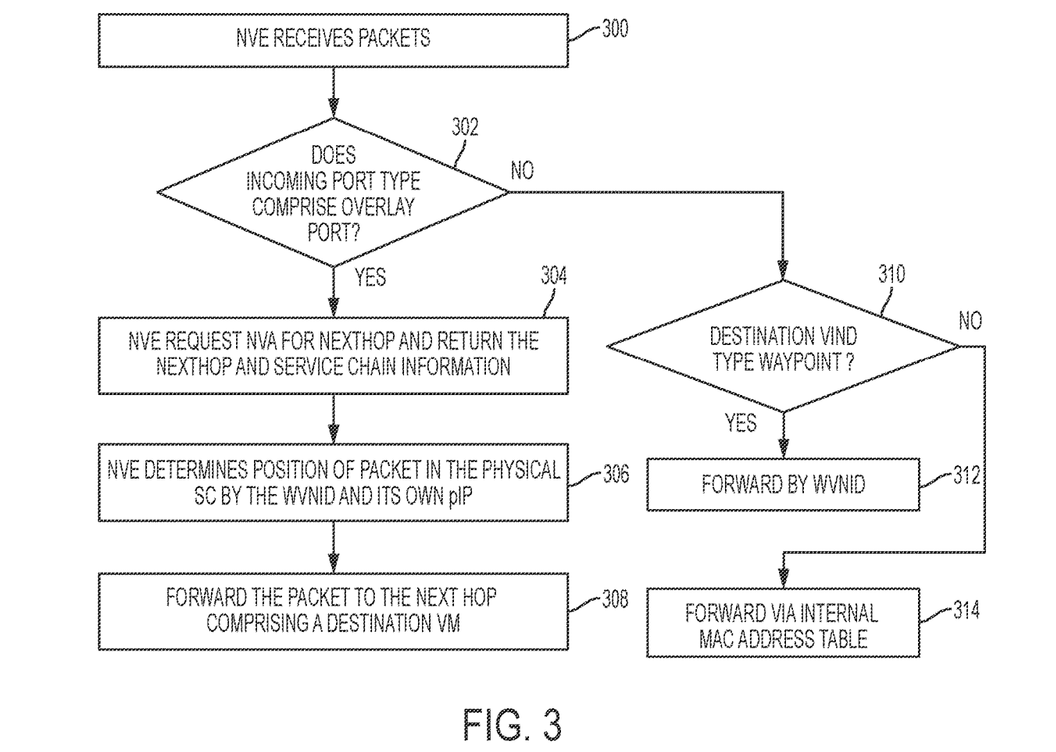
FIG. 3 illustrates an algorithm detailing a process flow enabled by the virtual networking environment system of FIG. 1 for enabling an NVE to forward a packet for a service chain, in accordance with embodiments of the present invention.

FIG. 3 illustrates an algorithm detailing a process flow enabled by virtual networking environment system 100 of FIG. 1 for enabling an NVE to forward a packet for a service chain, in accordance with embodiments of the present invention. Each of the steps in the algorithm of FIG. 3 may be enabled and executed in any order by a computer processor(s) or any type of specialized hardware executing computer code. In step 300, an NVE receives a packet. In step 302, it is determined if the packet was received from an overlay port. If in step 302, it is determined that the packet was not received from an overlay port then in step 310, a target type (waypoint or endpoint) is determined via a type of encapsulated VNID. If a destination VNID comprises a waypoint type then in step 312, the destination VNID is forwarded to a corresponding port adjacent to the VNID. If a destination VNID does not comprise a waypoint type then in step 314 the destination VNID is forwarded to a destination port via a destination MAC address of the packet presented from the NVE's MAC-table.

If in step 302, it is determined that the packet was received from an overlay port then in step 304, the NVA receives a request for a nexthop with the following information: {EVNID, dst_vIP, local_pIP} and if the NVA locates the VNID of the dst_vIP on the SC and the nexthop is determined to be a waypoint, then the NVA will reply with a nexthop VNID and the nexthop NVE's pIP in combination with the physical SC. In step 306, the NVE determines its position within the physical SC by the WVNID and its own pIP (WVNID, pIP). In step 308, the packet is forwarded to a nexthop comprising a target TS(vm). For example with respect to FIG. 1, if OVS3 receives a packet from w2 then an incoming node comprises (WVNID2, pIP3) and the nexthop is determined to be w3(WVNID3, pIP3) from the physical SC: {EVNID1, (pIP2, WVNID1), (pIP3, WVNID2), (pIP3, WVNID3), EVNID2}. If the packet is received from w3, then the OVS3 will forward it to the NVE4 with the EVNID2.

Figure 4:
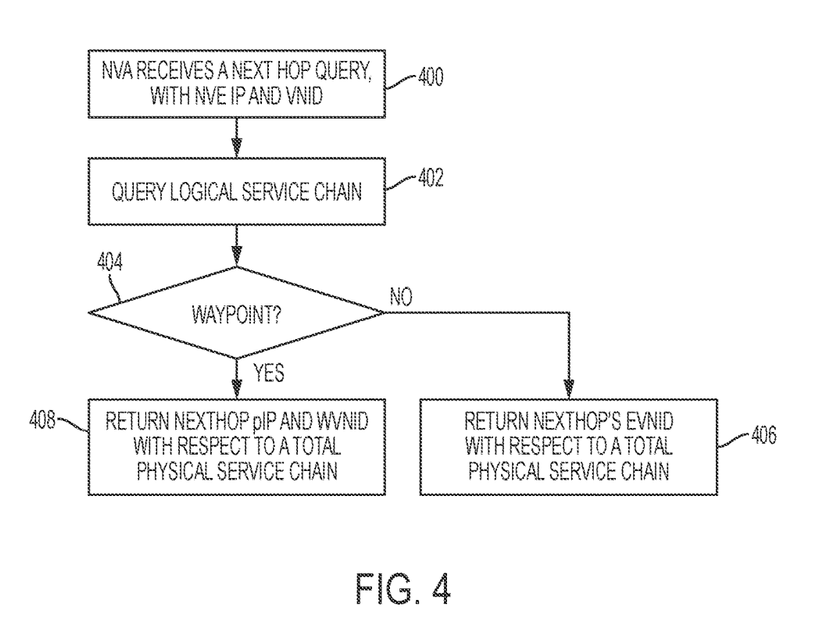
FIG. 4 illustrates an algorithm detailing a process flow enabled by the virtual networking environment system of FIG. 1 for enabling an NVA to respond to a query from an NVE in response to a request for address or routing information associated with a next hop or whole route, in accordance with embodiments of the present invention.

FIG. 4 illustrates an algorithm detailing a process flow enabled by virtual networking environment system 100 of FIG. 1 for enabling an NVA to respond to a query from an NVE in response to a request for address or routing information associated with a nexthop or whole route, in accordance with embodiments of the present invention. Each of the steps in the algorithm of FIG. 4 may be enabled and executed in any order by a computer processor(s) or any type of specialized hardware executing computer code. In step 400, an NVA receives a nexthop query associated with an NVE IP and associated VNID. In step 402, a logical service chain is queried. In step 404, it is determined if a waypoint is available. If in step 404, it is determined that a waypoint is available then in step 408, a nexthop pIP and WVNID is returned with respect to a total physical service chain. If in step 404, it is determined that a waypoint is not available then in step 406, a nexthop EVNID is returned with respect to a total physical service chain.

Figure 5:
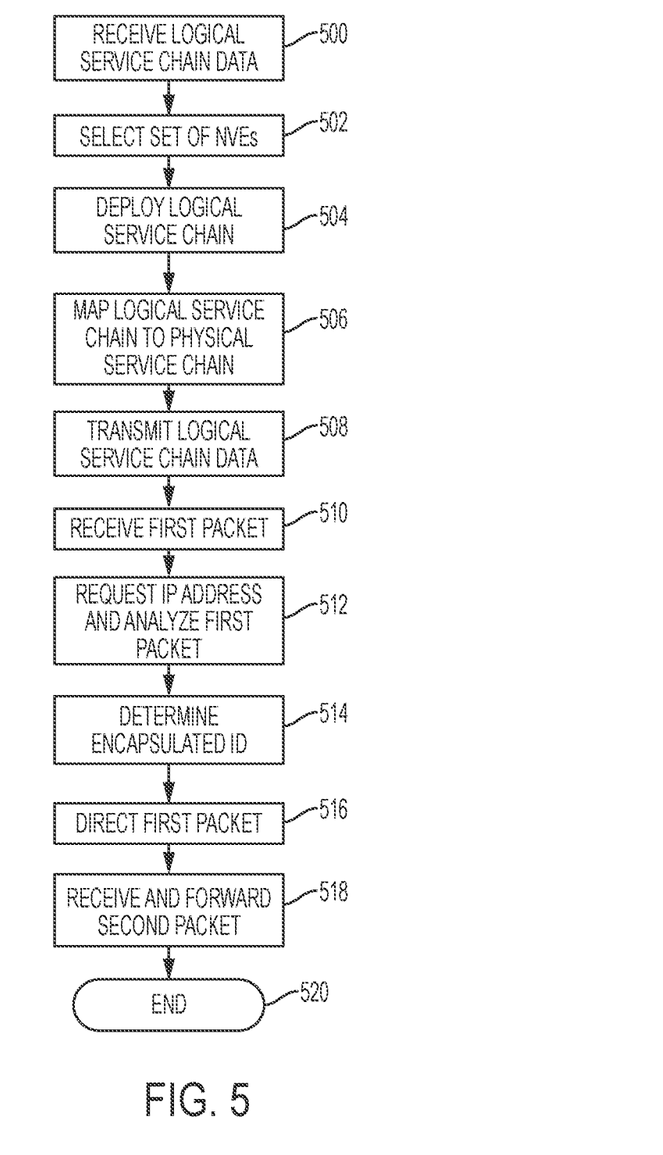
FIG. 5 illustrates an algorithm detailing a process flow enabled by the system of FIG. 1 for implementing a virtual network comprising overlapping waypoints, in accordance with embodiments of the present invention.

FIG. 5 illustrates an algorithm detailing a process flow enabled by virtual networking environment system 100 of FIG. 1 for implementing a virtual network comprising overlapping waypoints, in accordance with embodiments of the present invention. Each of the steps in the algorithm of FIG. 5 may be enabled and executed in any order by a computer processor(s) or any type of specialized hardware executing computer code. In step 500, logical service chain data is received by a controller. Controller may comprise a hardware device. The logical service chain data describes a source virtual network ID (VNID) for a source virtual network, a destination VNID for a destination virtual network, and a group of intermediate waypoints. The logical service chain data defines a logical service chain that includes the source virtual network, the destination virtual network, and the group of intermediate waypoints. In step 502, a set of networked virtual environments (NVE) to support the group of intermediate waypoints is selected. For each waypoint, a WVNID (waypoint type VNID) is generated for a selected NVE. A service node (e.g., a virtual machine (VM)) may be placed into a WVNID on an associated NVE. A combination of a WVNID and a physical IP of the NVE uniquely identifies a waypoint and is used to generate forwarding information on the NVA to forward a packet to a service node. In step 504, the logical service chain is deployed. In step 506, the logical service chain is mapped to a physical service chain implemented on the set of NVEs. In step 508, logical service chain data including a waypoint identifier (i.e., a WVNID and physical IP of an attached NVE) is transmitted to a network virtual authority (NVA) such that the NVA generates forwarding information for the service chain. In step 510, a first packet is received from an overlay port via a first NVE of the set of NVEs. In step 512, an associated IP address is requested in response to receiving the first packet and the first packet is analyzed. In step 514, it is determined that the first packet comprises an encapsulated ID associated with a waypoint of the group of intermediate waypoints and in step 516, the first packet is directed to a port associated with the waypoint. Alternatively, in step 514, it is determined that the first packet comprises an encapsulated ID associated with the destination virtual network and in step 516, the first packet is directed to a destination port via a destination MAC address of the first packet. In step 518, a second packet is received from an underlay port via a second NVE of the set of NVEs. In the destination VNID comprises a waypoint type then the second packet is forwarded to an associated port via the destination VNID. If the destination VNID does not comprise a waypoint type then the second packet is forwarded to an associated port via a Mac address of the second packet. Alternatively in step 518, a second packet is received from an overlay port via a second NVE of the set of NVEs the second packet is forwarded to a target virtual machine.

Figure 6:
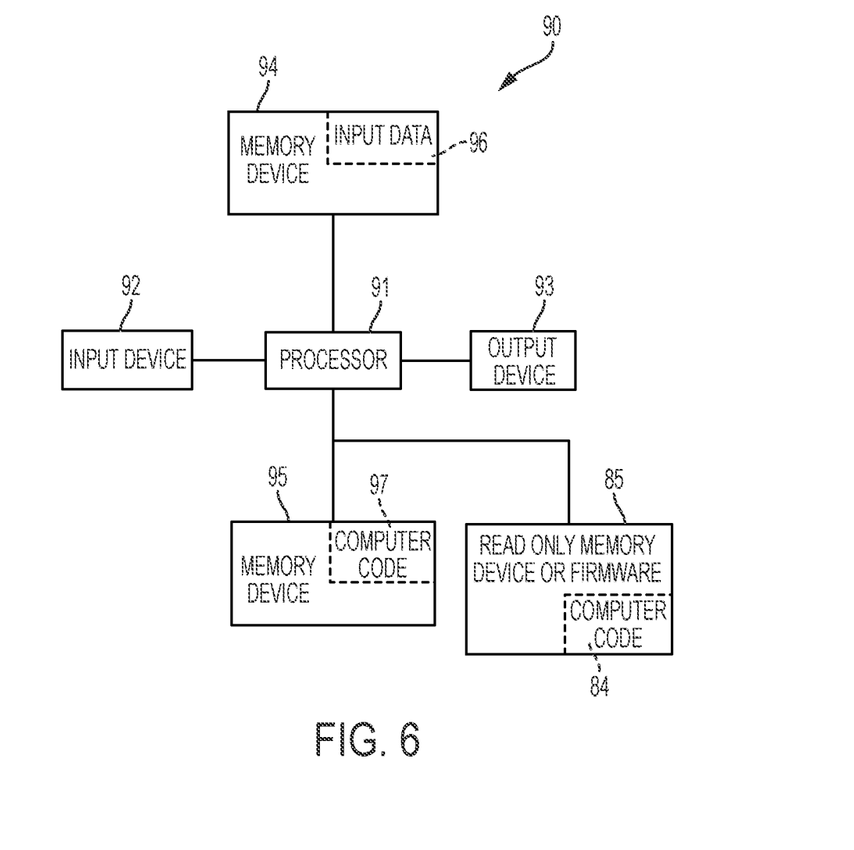
FIG. 6 illustrates a computer system used by the system of FIG. 1 for enabling a process for or implementing a virtual network comprising overlapping waypoints, in accordance with embodiments of the present invention.

FIG. 6 illustrates a computer system 90 (e.g., virtual machines107*a* and 107*b*, waypoints 109*a*-109*c*, overlay virtual switches 112*a*-112*d*, underlay IP network 110, NVA 104, and controller 117) used by or comprised by the system of FIG. 1 for enabling a process for implementing a virtual network comprising overlapping waypoints, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-5) for enabling a process for implementing a virtual network comprising overlapping waypoints. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithms of FIGS. 2-5) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithms of FIGS. 2-5) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to implement a virtual network comprising overlapping waypoints. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for implementing a virtual network comprising overlapping waypoints. In another embodiment, the invention provides a business method that performs the process steps of the invention on a subscription, advertising, and/or fee basis. That is, a service supplier, such as a Solution Integrator, could offer to enable a process for implementing a virtual network comprising overlapping waypoints. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An overlay virtual networking method comprising:
   receiving, by a processor of a controller hardware device, logical service chain data describing a source virtual network ID (VNID) for a source virtual network, a destination VNID for a destination virtual network, and a group of intermediate waypoints, said logical service chain data defining a logical service chain comprising said source virtual network, said destination virtual network, and said group of intermediate waypoints;
   selecting by said processor, a set of networked virtual environments (NVE) to support said group of intermediate waypoints;
   deploying, by said processor, said logical service chain;
   mapping, by said processor, said logical service chain to a physical service chain implemented on said set of NVEs;
   transmitting, by said processor to a network virtual authority (NVA), said logical service chain data;
   receiving from an overlay port, by said processor via a first NVE of said set of NVEs, a first packet;
   requesting, by said processor in response to said receiving said first packet, associated IP addresses; and
   analyzing, by said processor, said first packet.

2. The method of claim 1, further comprising;
   determining, by said processor, that said first packet comprises an encapsulated ID associated with a waypoint of said group of intermediate waypoints; and
   directing, by said processor, said first packet to a port associated with said waypoint.

3. The method of claim 1, further comprising;
determining, by said processor, that said first packet comprises an encapsulated ID associated with said destination virtual network; and
directing, by said processor, said first packet to a destination port via a destination MAC address of said packet.

4. The method of claim 1, wherein each waypoint of said group of intermediate waypoints comprises a different ID.

5. The method of claim 1, further comprising:
receiving from an underlay port, by said processor via a second NVE of said set of NVEs, a second packet.

6. The method of claim 5, wherein said destination VNID comprises a waypoint type, and wherein said method further comprises:
forwarding, by said processor, said second packet to an associated port via said destination VNID.

7. The method of claim 5, wherein said destination VNID does not comprise a waypoint type, and wherein said method further comprises:
forwarding, by said processor, said second packet to an associated port via a Mac address of said second packet.

8. The method of claim 1, further comprising:
receiving from an overlay port, by said processor via a second NVE of said set of NVEs, a second packet.

9. The method of claim 8, wherein said destination VNID comprises a waypoint type, and wherein said method further comprises:
forwarding, by said processor, said second packet to a target virtual machine.

10. The method of claim 1, wherein a waypoint of said group of intermediate waypoints is located within said physical service chain, wherein said waypoint is are identified by an associated attached port VNID and an NVE tunnel IP (pIP).

11. The method of claim 1, further comprising:
forwarding from said overlay port, by said processor, said first packet;
requesting from said NVA, by said processor, a nexthop;
returning, by said processor via said NVA, said nexthop and said physical service chain back to said first NVE.

12. The method of claim 1, further comprising:
providing at least one support service for at least one of creating, integrating, hosting, maintaining, and deploying computer-readable code in the control hardware, said code being executed by the computer processor to implement: said receiving said logical service chain data, said selecting, said deploying, said mapping, said transmitting, said receiving said first packet, said requesting, and said analyzing.

13. A computer program product, comprising a computer readable hardware storage device storing a computer readable program code, said computer readable program code comprising an algorithm that when executed by a computer processor of a controller hardware device implements an overlay virtual networking method, said method comprising:
receiving, by said processor, logical service chain data describing a source virtual network ID (VNID) for a source virtual network, a destination VNID for a destination virtual network, and a group of intermediate waypoints, said logical service chain data defining a logical service chain comprising said source virtual network, said destination virtual network, and said group of intermediate waypoints;
selecting by said processor, a set of networked virtual environments (NVE) to support said group of intermediate waypoints;
deploying, by said processor, said logical service chain;
mapping, by said processor, said logical service chain to a physical service chain implemented on said set of NVEs;
transmitting, by said processor to a network virtual authority (NVA), said logical service chain data;
receiving from an overlay port, by said processor via a first NVE of said set of NVEs, a first packet;
requesting, by said processor in response to said receiving said first packet, associated IP addresses; and
analyzing, by said processor, said first packet.

14. The computer program product of claim 13, wherein said method further comprises:
determining, by said processor, that said packet comprises an encapsulated ID associated with a waypoint of said group of intermediate waypoints; and
directing, by said processor, said first packet to a port associated with said waypoint.

15. The computer program product of claim 13, wherein said method further comprises:
determining, by said processor, that said first packet comprises an encapsulated ID associated with said destination virtual network; and
directing, by said processor, said first packet to a destination port via a destination MAC address of said first packet.

16. The computer program product of claim 13, wherein each waypoint of said group of intermediate waypoints comprises a different ID.

17. The computer program product of claim 13, wherein said method further comprises:
receiving from an underlay port, by said processor via a second NVE of said set of NVEs, a second packet.

18. The computer program product of claim 17, wherein said destination VNID comprises a waypoint type, and wherein said method further comprises:
forwarding, by said processor, said second packet to an associated port via said destination VNID.

19. The computer program product of claim 17, wherein said destination VNID does not comprise a waypoint type, and wherein said method further comprises:
forwarding, by said processor, said second packet to an associated port via a Mac address of said second packet.

20. A controller hardware device comprising a computer processor coupled to a computer-readable memory unit, said memory unit comprising instructions that when executed by the computer processor executes an overlay virtual networking method comprising:
receiving, by said processor, logical service chain data describing a source virtual network ID (VNID) for a source virtual network, a destination VNID for a destination virtual network, and a group of intermediate waypoints, said logical service chain data defining a logical service chain comprising said source virtual network, said destination virtual network, and said group of intermediate waypoints;
selecting by said processor, a set of networked virtual environments (NVE) to support said group of intermediate waypoints;
deploying, by said processor, said logical service chain;
mapping, by said processor, said logical service chain to a physical service chain implemented on said set of NVEs;

transmitting, by said processor to a network virtual authority (NVA), said logical service chain data;
receiving from an overlay port, by said processor via a first NVE of said set of NVEs, a first packet;
requesting, by said processor in response to said receiving said first packet, associated IP addresses; and
analyzing, by said processor, said first packet.

* * * * *